(12) United States Patent
Searls et al.

(10) Patent No.: US 8,117,492 B1
(45) Date of Patent: Feb. 14, 2012

(54) TECHNIQUES FOR BACKUP ERROR MANAGEMENT

(75) Inventors: Kirk Searls, Maitland, FL (US); Gregory Robert Dowers, II, Lake Mary, FL (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 12/696,891

(22) Filed: Jan. 29, 2010

(51) Int. Cl.
*G06F 11/00* (2006.01)
(52) U.S. Cl. ........................ 714/6.13; 714/6.14; 707/654
(58) Field of Classification Search ................... 707/654; 714/6.1
See application file for complete search history.

(56) References Cited

U.S. PATENT DOCUMENTS

| 6,330,570 | B1 * | 12/2001 | Crighton | 1/1 |
| 7,043,463 | B2 * | 5/2006 | Bonabeau et al. | 706/13 |
| 7,631,068 | B1 * | 12/2009 | Martins | 709/224 |
| 7,676,510 | B1 * | 3/2010 | Karinta | 707/654 |
| 7,827,367 | B2 * | 11/2010 | Imazu et al. | 711/162 |
| 2004/0204949 | A1 * | 10/2004 | Shaji et al. | 705/1 |
| 2005/0021524 | A1 * | 1/2005 | Oliver | 707/100 |
| 2005/0027956 | A1 * | 2/2005 | Tormasov et al. | 711/162 |
| 2005/0144526 | A1 * | 6/2005 | Banko | 714/38 |
| 2007/0208783 | A1 * | 9/2007 | Midgley et al. | 707/201 |

OTHER PUBLICATIONS

Alexi Popov, APBackup: User's guide, Copyright 2002-2008, pp. 3, 5, and 18, www.avpsoft.com/products/apbackup/download/.*
Acronis True Home Image 2009, User's Guide, 2008 (http://www.acronis.com/support/documentation/legacy.html).*
Tivoli Storage Manager, Version 5.5, 2007 (http://publib.boulder.ibm.com/infocenter/tivihelp/v1r1/index.jsp?topic=%2Fcom.ibm.itsmfdt.doc%2Fans50000.htm).*
"Tinderbox"; Tinderbox—FreeBSD Wiki; found at http://wiki.freebsd.org/Tinderbox?action=print; Oct. 8, 2009; 5 pages.

* cited by examiner

*Primary Examiner* — Robert Beausoliel, Jr.
*Assistant Examiner* — Neil Miles
(74) *Attorney, Agent, or Firm* — Wilmer Cutler Pickering Hale and Dorr LLP

(57) ABSTRACT

Techniques for backup error management are disclosed. In one particular exemplary embodiment, the techniques may be realized as a method for backup error management comprising receiving a backup job error from a backup job, providing an error indicator and at least one user selectable option, receiving a user input corresponding to the at least one user selectable option, and modifying a backup policy to address the error based at least in part on the received user input.

20 Claims, 4 Drawing Sheets

TECHNIQUES FOR BACKUP ERROR MANAGEMENT

FIELD OF THE DISCLOSURE

The present disclosure relates generally to backing up data and, more particularly, to techniques for backup error management.

BACKGROUND OF THE DISCLOSURE

Backup and archive policies can involve a number of different devices, drives, folders, partitions, and/or other portions of data. Providing error notifications for backup or archive errors encountered can be challenging. Reporting too many errors may make a job appear as failed and may require detailed troubleshooting by a user. Reporting too few errors may result in loss of data when an error is ignored.

In view of the foregoing, it may be understood that there may be significant problems and shortcomings associated with current backup and archival technologies.

SUMMARY OF THE DISCLOSURE

Techniques for backing up data are disclosed. In one particular exemplary embodiment, the techniques may be realized as a method for backup error management comprising receiving a backup job error from a backup job, providing an error indicator and at least one user selectable option, receiving a user input corresponding to the at least one user selectable option, and modifying a backup policy to address the error based at least in part on the received user input.

In accordance with other aspects of this particular exemplary embodiment, the error indicator may be provided in a backup job log containing contextual information associated with the error.

In accordance with further aspects of this particular exemplary embodiment, the at least one user selectable option may comprise an option to exclude a resource associated with the error from the one backup job.

In accordance with additional aspects of this particular exemplary embodiment, the resource may be excluded from subsequent instances of the backup job.

In accordance with additional aspects of this particular exemplary embodiment, the resource may be excluded from all future backup jobs.

In accordance with additional aspects of this particular exemplary embodiment, the method may further comprise excluding all resources of a specified category from the backup job.

In accordance with additional aspects of this particular exemplary embodiment, the specified category may comprise at least one of: resource hardware type, resource owner, resource group, resource location, resource network location, and resource status.

In accordance with additional aspects of this particular exemplary embodiment, the method may further comprise providing an option allowing a user to specify an exclusion duration.

In accordance with additional aspects of this particular exemplary embodiment, the exclusion duration may be specified by at least one of: a time period, a number of backup jobs run; and a criteria that must be met to end exclusion.

In accordance with additional aspects of this particular exemplary embodiment, the at least one user selectable option may comprise an option to ignore an error for the one backup job.

In accordance with additional aspects of this particular exemplary embodiment, the at least one user selectable option may further comprise an option to ignore an error for all future backup jobs.

In accordance with additional aspects of this particular exemplary embodiment, the method may further comprise ignoring all errors of a specified category from the backup job.

In accordance with additional aspects of this particular exemplary embodiment, the method may further comprise providing an option allowing a user to specify a duration during which the error is ignored in the backup job.

In accordance with additional aspects of this particular exemplary embodiment, the techniques may be realized as at least one processor readable storage medium for storing a computer program of instructions configured to be readable by at least one processor for instructing the at least one processor to execute a computer process for performing the method.

In another particular exemplary embodiment, the techniques may be realized as an article of manufacture for backup error management, the article of manufacture comprising at least one processor readable medium, and instructions stored on the at least one medium, wherein the instructions are configured to be readable from the at least one medium by at least one processor and thereby cause the at least one processor to operate so as to receive a backup job error from a backup job, provide an error indicator and at least one user selectable option, receive a user input corresponding to the at least one user selectable option, and modify a backup policy to address the error based at least in part on the received user input.

In yet another particular exemplary embodiment, the techniques may be realized as a system for backup error management comprising one or more processors communicatively coupled to a network, wherein the one or more processors are configured to receive a backup job error from a backup job. The one or more processors may be configured to provide an error indicator and at least one user selectable option, receive a user input corresponding to the at least one user selectable option, and modify a backup policy to address the error based at least in part on the received user input.

In accordance with additional aspects of this particular exemplary embodiment, the error indicator may be provided in a backup job log containing contextual information associated with the error.

In accordance with additional aspects of this particular exemplary embodiment, the at least one user selectable option may comprise an option to exclude a resource associated with the error from the backup job.

In accordance with additional aspects of this particular exemplary embodiment, the techniques may further comprise excluding all resources of a specified category from the backup job.

In accordance with additional aspects of this particular exemplary embodiment, the at least one user selectable option may comprise an option to ignore an error for the backup job.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
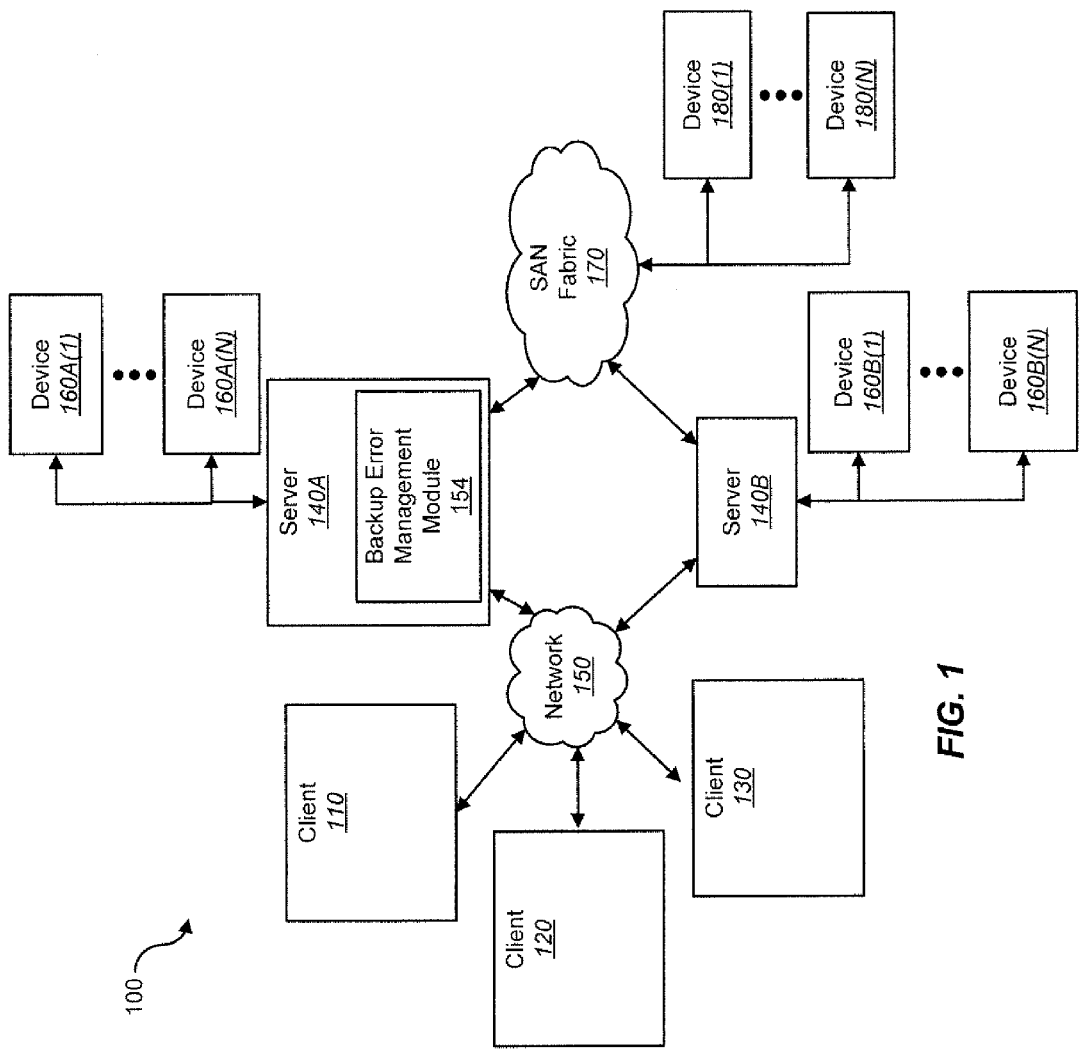
FIG. 1 shows a block diagram depicting a network architecture for backup error management in accordance with an embodiment of the present disclosure.

FIG. 1 shows a block diagram depicting a network architecture 100 for backup error management in accordance with an embodiment of the present disclosure. FIG. 1 is a simplified view of network architecture 100, which may include additional elements that are not depicted. Network architecture 100 may contain client systems 110, 120 and 130, as well as servers 140A and 140E (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a backup module (e.g., backup management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
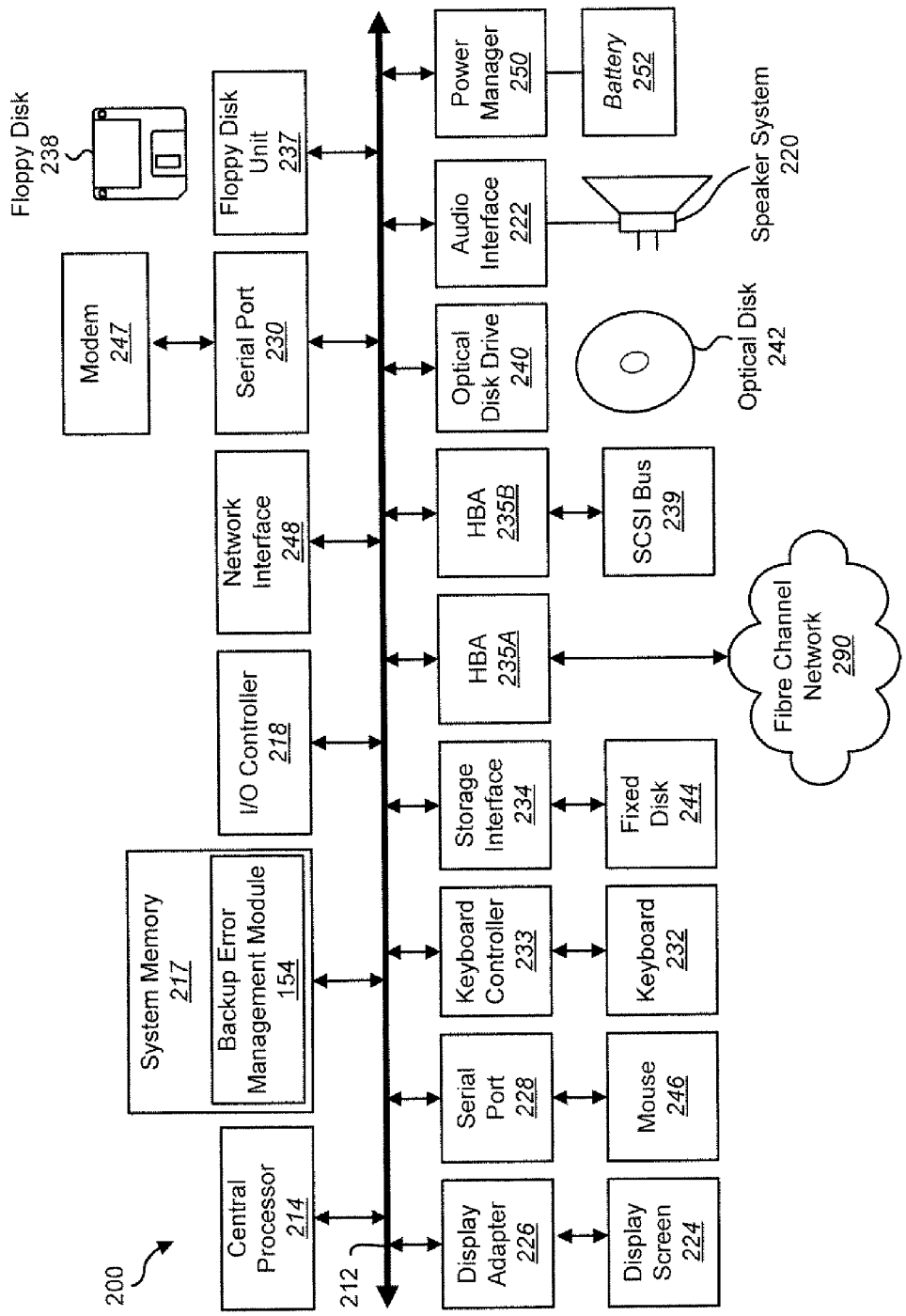
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 and/or servers 140A and 140B to network 150. Client systems 110, 120 and 130 may be able to access information on server 140A or 140B using, for example, a web browser or other client software (not shown). Such client software may allow client systems 110, 120 and 130 to access data hosted by server 140A or 140B or one of storage devices 160A(1)-(N), 160B(1)-(N), and/or 180(1)-(N).

Network 150 may be a local area network (LAN), a wide area network (WAN), the Internet, a cellular network, a satellite network, or another network that permits communication between clients 110, 120, 130, servers 140, and other devices communicatively coupled to network 150. Network 150 may further include one, or any number, of the exemplary types of networks mentioned above operating as a stand-alone network or in cooperation with each other. Network 150 may utilize one or more protocols of one or more clients or servers to which it is communicatively coupled. Network 150 may translate to or from other protocols to one or more protocols of network devices. Although network 150 is depicted as one network, it should be appreciated that according to one or more embodiments, network 150 may comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may backup and/or archive data based on a policy supplied by a backup/archive management server.

Backup management module 154 may generate a job log providing details of a backup or archive job. Errors may be included. Errors may include access or permission errors, device errors, configuration errors, or other errors. For example, a device scheduled for archiving may be offline, may have crashed, or an archive process may not have permission to access the device. Similarly, archiving or backup may have been scheduled for drives or partitions mapped to a user or application that has been deleted. A job log generated by backup management module 154 may include error messages associated with one or more of these errors and/or error messages associated with other errors. Error messages may provide context of an error message. In addition to providing an error associated with a particular operation, the job log may indicate a device, a path, a partition, a network address, an error type, and/or an error description. According to some embodiments, a user may be able to drill down or expand an error message by clicking on it, expanding it, or activating another user control associated with an error message in a job log. A job log may also contain one or more options associated with an error. For example, an error may contain an icon, a hyperlink, or another indicator allowing a user to access one or more options associated with that error. Options may include excluding a resource from a job, ignoring an error, retrying an operation, escalating an error, performing a diagnostic option, and/or generating a notification. For example, an error in an archive job may be associated with a device or a network drive mapping that has been removed from a system. A user viewing such an error in a backup job may choose to exclude the resource from the backup job.

Backup management module 154 may allow user to specify which resource or resources to exclude from a job. Resources may be devices, network paths, drive mappings, data associated with users, data associated with applications, servers, databases, partitions, or other network accessible devices or portions of data. A user may also specify a category of resource to exclude from an archive job or a backup job. For example, an administrator may exclude all resources of a specified category from at least one backup job. A category may include a resource hardware type, a resource owner, a resource group, a resource location, a resource network location, a resource status, or another resource category identifier. For example, an administrator may know that a certain type of resource, such as devices of a certain manufacturer, model, and version, are offline for upgrading. In another example, an administrator may be aware that resources associated with a terminated user may have been deleted. According to some embodiments, a resource, a resource category, and/or a group of resources, may be specified by a resource identifier.

Backup management module 154 may allow an administrator to specify the range of exclusion. For example, an administrator may view a job log with an archive error for an operation archiving email data associated with a user. The administrator may choose to exclude this resource (e.g., the user's email directory) from one or more subsequent instances of the archive job. The administrator may also choose to exclude this resource from other jobs such as, for example, a backup job associated with the resource. According to some embodiments, an administrator may choose to exclude the resource from all future backup jobs. Additionally, a user may choose to exclude a resource category from all future backup jobs. The range of exclusion may be specified by one or more job identifiers, by a job type, or by other criteria. For example, a user may exclude a group of resources from archiving jobs but not from backup jobs.

In addition to specifying one or more resources to exclude and one or more jobs to exclude them from, backup management module 154 may allow a user to specify an exclusion duration, according to some embodiments. For example, the exclusion duration may be specified by one or more of a time period, a number of jobs run, and a criteria that may be met to end exclusion. A user may specify a time period (e.g., days, weeks, months, etc.). A user may also specify a number of jobs (e.g., exclude the resource for the next N number of jobs). A user may alternatively or additionally specify a criteria to be met either to exclude a resource or to include a resource in a job (e.g., do not backup this host until it is pingable or network accessible). According to some embodiments, one or more tests may be run prior to a job to verify whether specified criteria are met. According to some embodiments, at the end of the duration the one or more resources may no longer be excluded and one or more policies and/or jobs may revert to include the resource in one or more jobs.

Backup management module 154 may provide one or more exclusion options associated with an error or a warning in a job log and may accept one or more user inputs associated with the options. Inputs accepted by backup management module 154 may be used to modify one or more policies and/or one or more jobs for backup, archival, or other system administration jobs (e.g., encryption, compression, deletion, and/or modification of data).

Backup management module 154 may provide other options for a user viewing a job log. For example, backup management module 154 may allow a user to ignore an error for at least one job. A user may be presented with options allowing them to ignore the error in subsequent instances of the same backup job and/or in all future backup jobs. According to some embodiments, a user may be able to specify that all errors with a particular resource, group of resources, or category of resources be ignored.

In addition to specifying one or more errors to ignore and one or more jobs in which to ignore the specified errors, backup management module 154 may allow a user to specify a duration during which the one or more errors are to be ignored. For example, the duration may be specified by one or more of a time period, a number of jobs run, and a criteria that may be met to stop ignoring the one or more specified errors. According to some embodiments, at the end of the duration, a user may be prompted regarding whether to continue ignoring one or more errors. According to some embodiments, at the end of the duration the error may no longer be ignored and one or more policies and/or jobs may revert to include the error in a log.

Another option provided by backup management module 154 for error management may include generation of a notification. A user may specify that a particular error is to generate a notification when it occurs. According to one or more embodiments, backup management module 154 may allow a user to specify additional logging or diagnostics to be performed in association with an error. Such logging or diagnostics may enable a user to identify or address an error in subsequent jobs.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (MBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, backup error management module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
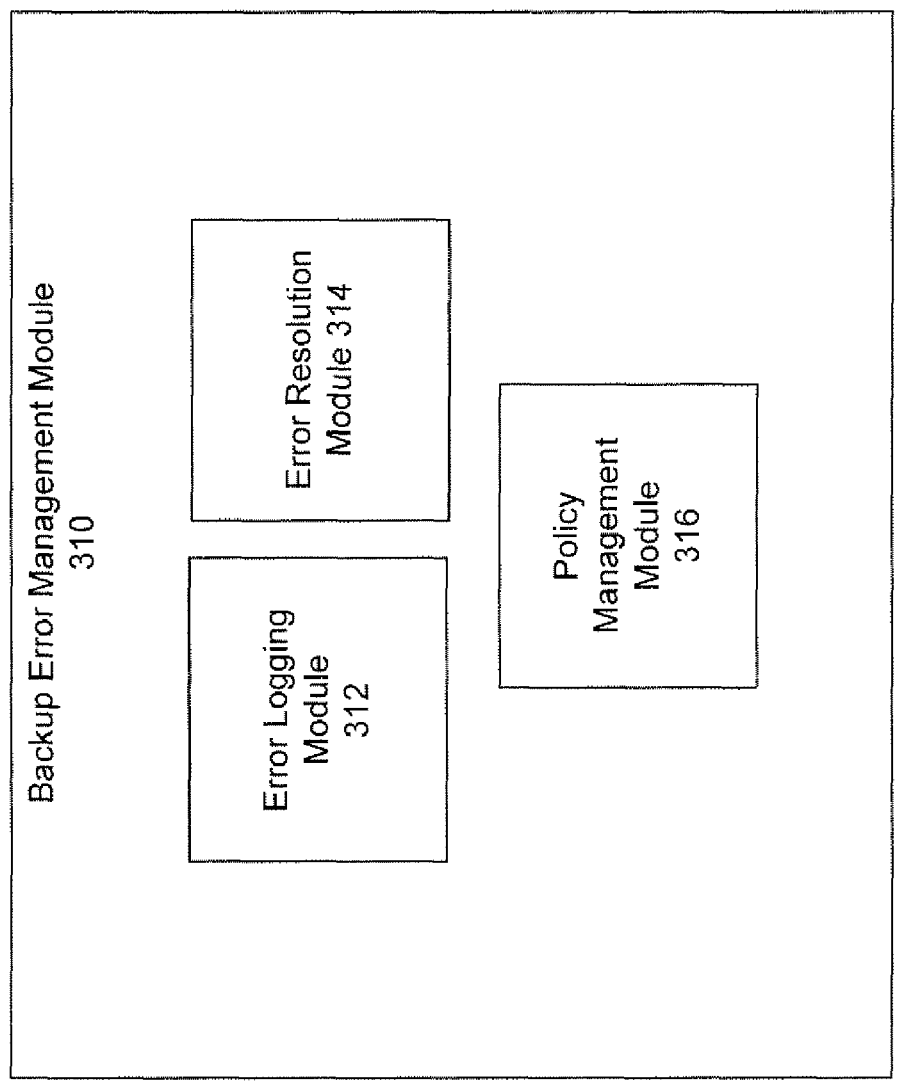
FIG. 3 shows a module for backup error management in accordance with an embodiment of the present disclosure.

Referring to FIG. 3, there is shown a backup error management module 310 in accordance with an embodiment of the present disclosure. As illustrated, the backup error management module 310 may contain one or more components including a error logging module 312, a error resolution module 314, and a policy management module 316.

The description below describes network elements, computers, and/or components of a system and method for client power level aware backup management that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Error logging module 312 may generate error formatting in a job log providing error context and one or more error handling options. Error logs may be generated in XML, HTML, or other formats. Errors may contain a link or another indicator allowing a user to access one or more options or user controls associated with that error.

Error resolution module 314 may provide a user interface and/or accept user input from one or more options or user controls associated with an error. Options may include excluding a resource from a job, ignoring an error, escalating an error, performing a diagnostic option, generating a notification, retrying a job action or step, and/or other error handling options.

Policy management module 316 may receive user inputs associated with errors. Inputs accepted by policy management module 316 may be used to modify one or more policies and/or one or more jobs for backup, archival, or other system administration jobs (e.g., encryption, compression, deletion, and/or modification of data). According to some embodiments, if a duration for an option is specified (e.g., exclude this resource from archival for this period of time), policy management module 316 may prompt a user after the expiration of the duration. The prompt may allow the user to extend the duration (e.g., continue the exclusion), determine whether the duration should be extended, and/or revert back to a prior policy or job (e.g., end an exclusion or stop ignoring an error).

Figure 4:
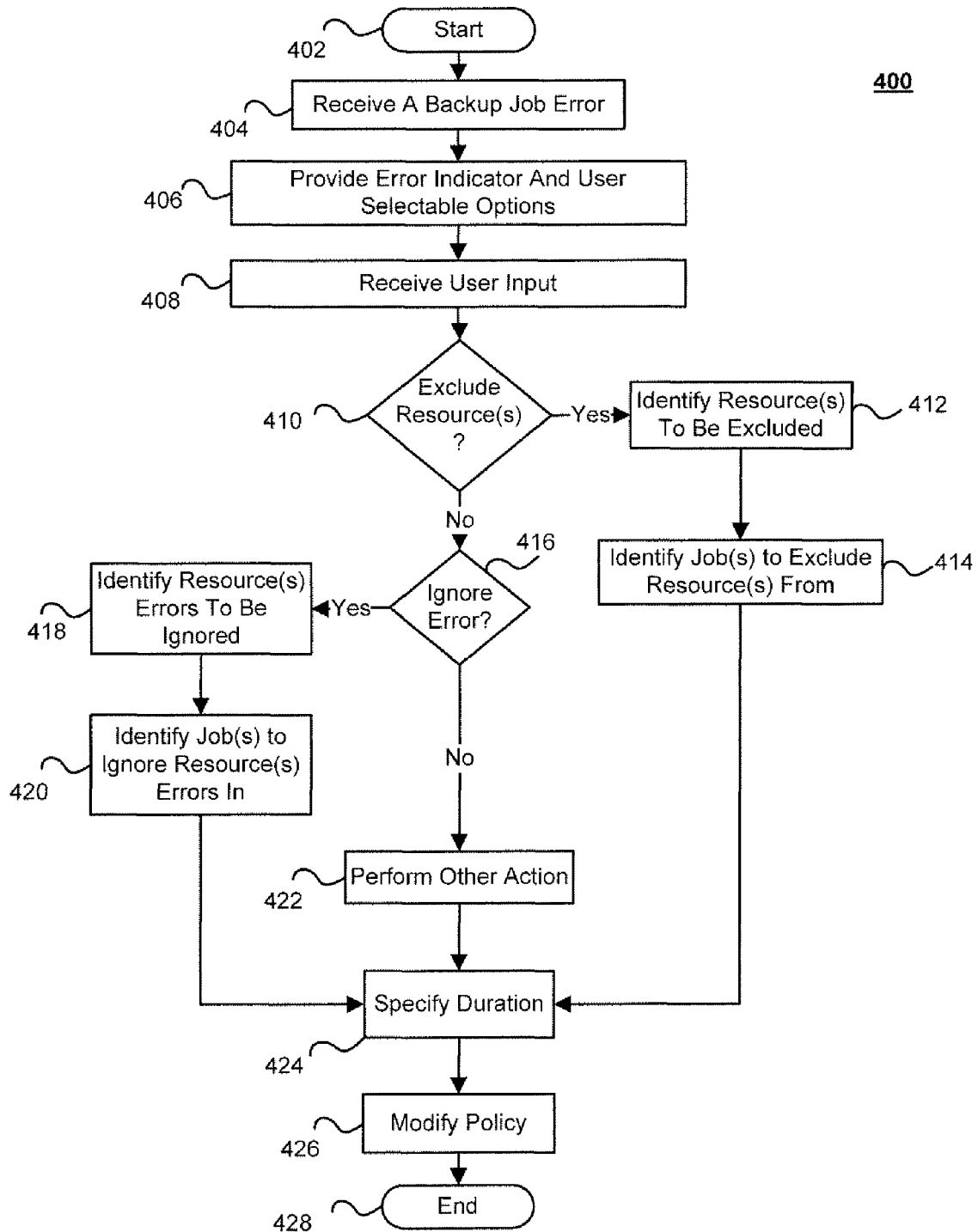
FIG. 4 depicts a method for backup error management in accordance with an embodiment of the present disclosure.

Referring to FIG. 4, there is depicted a method 400 for backup error management in accordance with an embodiment of the present disclosure. At block 402, the method 400 may begin.

At block 404, a job error such as, for example, a backup job or an archive job error is received.

At block 406, a job log or other job output may provide an error indicator and one or more user selectable options associated with an error. Options may include excluding a resource from a job, ignoring an error, retrying an operation, escalating an error, performing a diagnostic option, generating a notification, retrying a job action or step, and/or other error handling options.

At block 408, user input may be received. According to some embodiments, user input may be provided via clicking on a hyperlink, clicking a button, selecting a menu option, a command line entry, or via other input.

At block 410, it may be determined whether or not one or more resources should be excluded according to received user input. If one or more resources are to be excluded, the method 400 may continue at block 412. If resources are not to be excluded, the method 400 may continue at block 416.

At block 412, the method may identify one or more resources to be excluded. Resources may be devices, network paths, drive mappings, data associated with users, data associated with applications, servers, databases, partitions, or other network accessible devices or portions of data. According to some embodiments, a single resource may be identified by one or more criteria associated with an error in a job log. According to at least one embodiment, a user may also specify a category of resource to exclude from an archive job or a backup job. For example, an administrator may exclude all resources of a specified category from at least one backup job. A category may include a resource hardware type, a resource owner, a resource group, a resource location, a resource network location, resource status, or another resource category identifier. For example, an administrator may know that a certain type of resource, such as devices of a certain manufacturer, model, and version, are offline due to a network problem. According to some embodiments, a resource, a resource category, and/or a group of resources, may be specified by a resource identifier.

At block 414, one or more jobs may be specified to exclude the specified resources from. According to some embodiments, a user may exclude a resource from subsequent instances of a job in which an error occurred, of all jobs of that type (e.g., full backup, incremental backup, archive, etc.), or of a range of jobs. According to some embodiments, a user may enter criteria to search for jobs in which a resource is included, to filter search results, and/or to specify jobs from which the resource is to be excluded.

At block 416, it may be determined whether or not an error should be ignored. If an error should be ignored the method may continue at block 418. If an error should not be ignored the method may continue at block 422.

At block 418, one or more resource errors to be ignored may be identified. A user may be presented with options allowing them to ignore the error in subsequent instances of the same backup job and/or in all future backup jobs. According to some embodiments, a user may be able to specify that all errors with a particular resource, group of resources, or category of resources be ignored.

At block 420, one or more jobs in which to ignore a resource error may be specified. According to some embodiments, a user may ignore a resource error in subsequent instances of a job in which an error occurred, of all jobs of that type (e.g., full backup, incremental backup, archive, etc.), or of a range of jobs. According to some embodiments, a user may enter criteria to search for jobs in which a resource is included, to filter search results, and/or to specify jobs from which the resource error is to be ignored.

At block 422, one or more other actions may be specified by a user in response to a job error. Other options may include escalating an error, performing a diagnostic option, generating a notification, retrying a job action or step, and/or other error handling options.

At block 424, a duration during which a specified option is to occur may be specified (e.g., the duration of the exclusion of the resource from one or more jobs.) For example, the duration may be specified by one or more of a time period, a number of jobs run, and a criteria that may be met to stop the option (e.g., to stop ignoring an error or excluding a resource). According to some embodiments, at the end of the duration, a user may be prompted regarding whether to continue an option. According to some embodiments, at the end of the duration one or more policies and/or jobs may revert as they were prior to an option.

At block 426, inputs accepted for error management options may be used to modify one or more policies and/or one or more jobs for backup, archival, or other system administration jobs (e.g., encryption, compression, deletion, and/or modification of data). According to some embodiments, if a duration for an option is specified (e.g., exclude this resource from archival for this period of time), a user may be prompted after the expiration of the duration. The prompt may allow the user to extend the duration (e.g., continue the exclusion), determine whether the duration should be extended, and/or revert back to a prior policy or job (e.g., end an exclusion or stop ignoring an error).

At block 428, the method 400 may end.

At this point it should be noted that backup error management in accordance with the present disclosure as described above typically involves the processing of input data and the generation of output data to some extent. This input data processing and output data generation may be implemented in hardware or software. For example, specific electronic components may be employed in a backup management module or similar or related circuitry for implementing the functions associated with backup error management in accordance with the present disclosure as described above. Alternatively, one or more processors operating in accordance with instructions may implement the functions associated with backup error management in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for backup error management comprising:
receiving a first backup job error from a backup job;
providing an error indicator and at least one user selectable option;
receiving a user input corresponding to the at least one user selectable option; and
modifying a backup policy based at least in part on the received user input and the first backup error, wherein modifying the backup policy comprises at least one of:
ignoring a second backup job error in a subsequent instance of the backup job; and
excluding a resource from a subsequent instance of the backup job; and
providing an option to allow a user to specify an exclusion duration time period of at least one resource.

2. The method of claim 1, wherein the error indicator is provided in a backup job log containing contextual information associated with the error.

3. The method of claim 1, wherein the at least one user selectable option comprises an option to exclude a resource associated with the error from the backup job.

4. The method of claim 3, wherein the resource is excluded from subsequent instances of the backup job.

5. The method of claim 3, wherein the resource is excluded from all future backup jobs.

6. The method of claim 3, further comprising excluding all resources of a specified category from the backup job.

7. The method of claim 6, wherein the specified category comprises at least one of: resource hardware type, resource owner, resource group, resource location, resource network location, and resource status.

8. The method of claim 1, wherein the exclusion duration is specified by at least one of: a time period, a number of backup jobs run, and a criteria that must be met to end exclusion.

9. The method of claim 1, wherein the at least one user selectable option comprises an option to ignore an error for the backup job.

10. The method of claim 1, wherein the at least one user selectable option further comprises an option to ignore an error for all future backup jobs.

11. The method of claim 9, further comprising ignoring all errors of a specified category from the backup job.

12. The method of claim 9, further comprising providing an option allowing a user to specify a duration during which the error is ignored in the backup job.

13. At least one non-transitory processor readable storage medium for storing a computer program of instructions configured to be readable by at least one processor for instructing the at least one processor to execute a computer process for performing the method as recited in claim 1.

14. An article of manufacture for backup error management, the article of manufacture comprising:
- at least one non-transitory processor readable storage medium; and
- instructions stored on the at least one medium;
- wherein the instructions are configured to be readable from the at least one medium by at least one processor and thereby cause the at least one processor to operate so as to:
- receive a first backup job error from a backup job;
- provide an error indicator and at least one user selectable option;
- receive a user input corresponding to the at least one user selectable option;
- modify a backup policy based at least in part on the received user input and the first backup error, wherein modifying the backup policy comprises at least one of:
  - ignoring a second backup error in a subsequent instance of the backup job; and
  - excluding a resource from a subsequent instance of the backup job; and
- providing an option to allow a user to specify an exclusion duration time period of at least one resource.

15. A system for backup error management comprising:
- one or more processors communicatively coupled to a network; wherein the one or more processors are configured to:
- receive a first backup job error from a backup job;
- provide an error indicator and at least one user selectable option;
- receive a user input corresponding to the at least one user selectable option; and
- modify a backup policy based at least in part on the received user input and the first backup error, wherein modifying the backup policy comprises at least one of:
  - ignoring a second backup error in a subsequent instance of the backup job; and
  - excluding a resource from a subsequent instance of the backup job; and
- providing an option to allow a user to specify an exclusion duration time period of at least one resource.

16. The system of claim 15, wherein the error indicator is provided in a backup job log containing contextual information associated with the error.

17. The system of claim 15, wherein the at least one user selectable option comprises an option to exclude a resource associated with the error from the backup job.

18. The system of claim 17, further comprising excluding all resources of a specified category from the backup job.

19. The system of claim 15, wherein the at least one user selectable option comprises an option to ignore an error for the backup job.

20. The system of claim 15, wherein the exclusion duration is further specified by at least one of: a number of backup jobs run and a criteria that must be met to end exclusion.

* * * * *